Oct. 20, 1964     G. A. HOENKE     3,153,363
CUTTING DEVICE FOR PLASTIC FOAMS
Filed Dec. 5, 1960
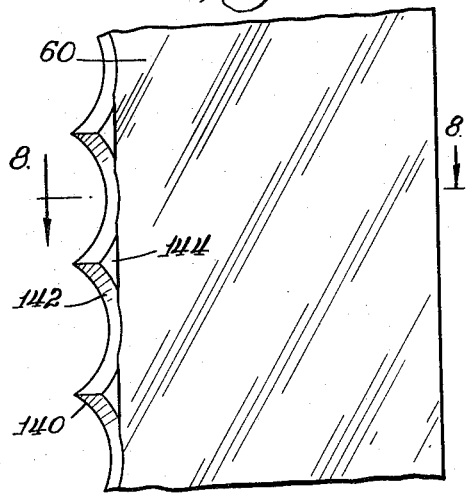
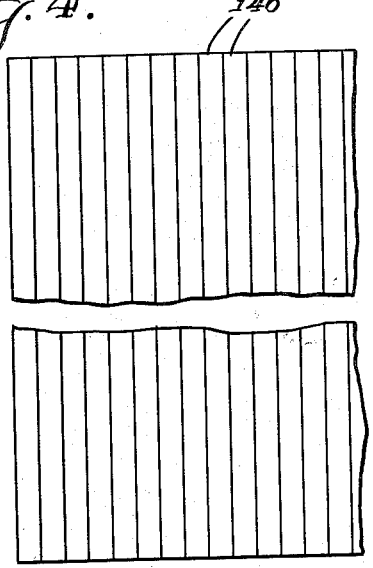
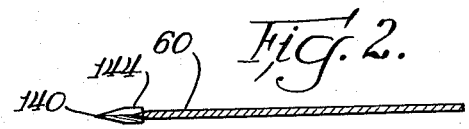
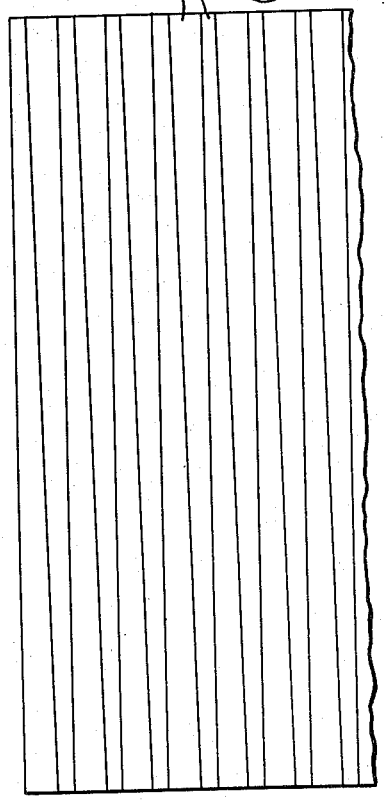
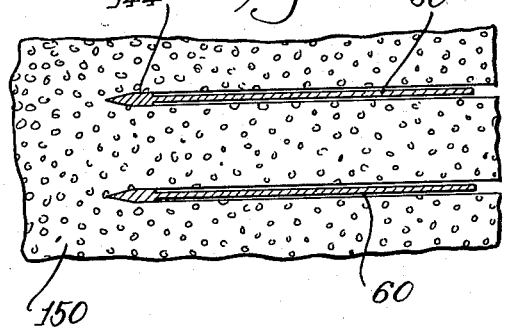
INVENTOR.
Guy A. Hoenke

United States Patent Office 3,153,363
Patented Oct. 20, 1964

3,153,363
CUTTING DEVICE FOR PLASTIC FOAMS
Guy A. Hoenke, Midland, Mich., assignor to The Dow Chemical Company, Midland, Mich., a corporation of Delaware
Filed Dec. 5, 1960, Ser. No. 73,636
2 Claims. (Cl. 83—427)

This invention relates to apparatus for cutting rigid and semi-rigid foam plastics.

The cutting device of this invention is especially suited for cutting foam plastic blocks into relatively thin sheets, or sections, such foam plastic being of the alkenyl aromatic resin and alpha-olefin types.

Various methods have been utilized for the cutting of foam plastic blocks into thin sheets, such as with the use of bandsaws, circular saws, single sash reciprocating saws, and hot wire cutting equipment. However, the cutting blades of devices leave much to be desired since, among other things, they display one or more of the following disadvantages: slow cutting speeds and single pass operation: kerf wastage: dust left on or in product: rough cut, gouged or glazed surfaces: fire and toxicity hazard accompanying use of hot wire cutting: limitation of block size as when employing a circular saw: and lack of uniform cutting thickness due to blade wander, as often occurs with a bandsaw.

The main object of this invention is to provide a blade for cutting rigid and semi-rigid foam plastics.

Another object is to provide a blade for cutting foam plastics at high rate cutting speeds.

Still another object is to provide a blade for cutting foam plastics wherein there is no kerf loss.

Another object is to provide a blade for cutting foam plastic wherein no dust is produced, and smooth, clean and unglazed cut surfaces are obtained.

A further object of the invention is to provide a blade for cutting foam plastics wherein danger of fire, or toxicity is eliminated.

These and further objects and features of the invention will become more apparent from the following description and accompanying drawings wherein:

FIG. 1 is a fragmentary side elevation view of the cutting element of this invention;

FIG. 2 is a section view generally as seen along line 8—8 in FIG. 1;

FIG. 3 is a section view illustrating a pair of cutting elements in the process of cutting a plastic foam material;

FIG. 4 is an end view of a block of plastic foam material which has been cut into uniform thickness sheets;

FIG. 5 is an end view of a block of plastic foam material which has been cut into sheets having tapered sides.

As seen in FIG. 1, the cutting elements, or blades, 60, have a plurality of serrated teeth 140 of generally semi-circular configuration with a razor sharp edge 142 extending along the edge of the tooth profile. A hump, or protrusion 144, is arranged to project outwardly from each side of the blade, each hump being substantially in alignment with an adjacent tooth point. The humps 144 develop a peening, swaging or planing action which enable the blade to cut straight, i.e., no wandering, and to operate without excessive heating, as is usually generated by blades not having such a novel construction detail. Cutting action of the blades 60 is illustrated in FIG. 3, wherein two blades are shown in cross section in the process of cutting a block of plastic foam material 150 into thin sheets by a reciprocable movement of the blades in a plane transverse to the path of movement of the blades. It will be noted that the cut produced is sufficiently wide so that the sides of a blade working therein will not rub thereagainst, hence frictional heat and resulting glazed cut surfaces is minimized.

FIG. 4 illustrates an end view of a block of plastic foam, which has been cut into a plurality of uniform thickness sheets 146, by the blade above described. FIG. 5 illustrates a block of plastic foam which has been cut into a plurality of sheets 148, each having a tapered cross section as shown.

It will be apparent from the foregoing description that the apparatus will satisfy the objectives hereinbefore set forth.

The foregoing description has been given in detail without thought of limitation since the inventive principles involved are capable of assuming other forms without departing from the spirit of the invention as set forth in the following claims.

What is claimed is:

1. A cutting element for use in cutting plastic foam material, comprising a blade having a substantially arcuate serrated edge to provide a plurality of pointed teeth, the tips of which are in alignment with each other, a cutting edge formed along the serrated edge, which cutting edge extends between and to the tips of adjacent teeth, and a series of discrete bumps arranged on each side of the blade and at a point inwardly of the tips of said pointed teeth, thereby providing portions thicker than said body, said bumps projecting outwardly beyond the sides of the blade, whereby said bumps will develop a penning action on the surfaces of the cut foam material initially severed by the tips.

2. A cutting element for use in cutting plastic foam material, comprising a blade having a substantially arcuate serrated edge to provide a plurality of pointed teeth, the tips of which are in alignment with each other, a cutting edge formed along the serrated edge which cutting edge extends between and to the tips of adjacent teeth, and a series of discrete triangular bumps arranged on each side of the blade and at a point inwardly of the tips of said pointed teeth, thereby providing portions thicker than said body said bumps projecting outwardly beyond the sides of the blade and having the two edges of its triangular configuration coinciding with said cutting edge and acting as a continuation of the cutting edge of said blade, whereby said bumps will develop a peening action on the surfaces of the cut foam material initially severed by the tips.

References Cited in the file of this patent

UNITED STATES PATENTS

| | | |
|---|---|---|
| 501,799 | Mackey | July 18, 1893 |
| 1,120,270 | Brussolo | Dec. 8, 1914 |
| 1,388,547 | Burns | Aug. 23, 1921 |
| 1,489,419 | Beechlyn | Apr. 8, 1924 |
| 1,685,239 | Moran | Sept. 25, 1928 |
| 1,834,762 | Bjorklund | Dec. 1, 1931 |
| 1,925,143 | Hartman | Sept. 5, 1933 |
| 2,024,157 | Fritz | Dec. 17, 1935 |
| 2,060,460 | Creech | Nov. 10, 1936 |
| 2,083,429 | Castriana | July 8, 1937 |
| 2,095,620 | Tuthill | Oct. 12, 1937 |
| 2,247,675 | Thum | July 1, 1941 |
| 2,255,620 | Jenson | Sept. 9, 1941 |
| 2,437,122 | Petskeyes | Mar. 2, 1948 |
| 2,654,428 | Martincic | Oct. 6, 1953 |
| 2,692,428 | Morishita | Oct. 26, 1954 |
| 2,825,968 | Baer | Mar. 11, 1958 |
| 2,834,108 | Thompson | May 13, 1958 |

FOREIGN PATENTS

| | | |
|---|---|---|
| 12,030 | Great Britain | 1910 |